United States Patent [11] 3,614,013

[72] Inventors Yoshio Kuramoto Sakai;
 Toshio Kobori, Izumichtsu, Osaka, both of Japan
[21] Appl. No. 844,345
[22] Filed July 24, 1969
[45] Patented Oct. 19, 1971
[73] Assignee Minolta Camera Kabushiki Kaisha
 Osaka, Japan
[32] Priority Aug. 22, 1968
[33] Japan
[31] 43/72 370

[54] SPOOL FOR WINDING FILMS
 9 Claims, 8 Drawing Figs.
[52] U.S. Cl. .................................................... 242/74
[51] Int. Cl. ................................................ B65h 75/28
[50] Field of Search ....................................... 242/74

[56] References Cited
 UNITED STATES PATENTS
2,137,502 11/1938 Nerwin ......................... 242/74
 FOREIGN PATENTS
 880,253 3/1943 France ......................... 242/74
1,242,492 8/1960 France ......................... 242/74

Primary Examiner—Stanley N. Gilreath
Assistant Examiner—Gregory A. Walters
Attorney—Stanley Wolder ABSTRACT: A spool for winding films, having a holding means disposed at a position engageable with perforations of a film, which holding means is both engageable with and disengageable from the perforations when the film moves lateral to the longitudinal centerline thereof, but only engageable with the film when the film moves longitudinally.

PATENTED OCT 19 1971

INVENTOR.
Yoshio Kuramoto
BY Toshio Kobori

Stanley Wolder
ATTORNEY

SPOOL FOR WINDING FILMS

This invention relates to a spool for winding films, having a film-holding means disposed on the outer periphery of a cylindrical portion of the spool, and more particularly to the spool which enables easy and quick loading of a film in a highly reliable manner.

In a conventional spool, a slanted slot is provided at a suitable portion of the film-winding portion of the spool, so that the leading end of a film is inserted into the slanted slot for effecting frictional holding of the film by the spool. In another conventional spool, one or more claws are provided at a suitable portion of the spool so that one of the claws engages a perforation of the film inserted through a suitable notch provided in the spool, for the purpose of ensuring the holding of the film end. In the former-type spool, the film is held only by frictional force. If, thus, the width of the slot is made narrower so as to increase the frictional force for improving the reliability of the film holding, the initial insertion of the leading end of the film becomes difficult. On the other hand, in the latter-type spool, film is reliably held by the spool, but it is difficult to separate the film from the claw, and the film is often broken when being separated from the spool.

Therefore, an object of the present invention is to provide an improved spool for winding films, obviating all the aforesaid difficulties in the conventional spool as referred to. The spool according to the present invention comprises a film-holding means disposed at such a portion of the spool where perforations of a film will be located on the spool cylinder, which film-holding means is both engageable with and disengageable from one of the film perforations when the film moves lateral to the longitudinal direction of the film, while being only engageable with one of the film perforations when the film moves longitudinally. Thus, with the spool of the invention, when inserting the leading end of the film into the spool, the film can easily pass over a film-engaging claw of the spool by laterally movement of the film-leading end, while effecting the engagement of the film perforation with the film-holding means simply by pulling the film laterally, without necessitating any complicated operation for bringing one of the film perforations into engagement with the claw of the spool. Accordingly, easy and quick loading of the film on the spool can be effected by using the spool of simple construction, in highly reliable fashion. Furthermore, the film can be separated from the spool without risking the breakage of the film, as experienced in some conventional spools.

Other objects and a fuller understanding of the present invention may be had by referring to the following description, taken in conjunction with the accompanying drawings, in which.

Like parts and members are designated by like numerals and symbols throughout the drawings.

Figure 1:
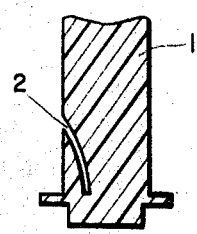
FIGS. 1 and 2 are vertical sectional views, illustrating different conventional film-holding members of spools, respectively.
Figure 2:
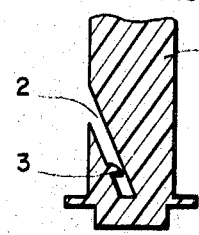

In conventional film-holding members of spool, as shown in FIGS. 1 and 2, a film-holding member 4 of FIG. 1 has a slit 2, while a film-holding member 1 of FIG. 2 has both a slit 2 and a claw 3. As pointed out in the foregoing, the film-holding member of FIG. 1 cannot reliably hold the film, and that of FIG. 2 causes breakage of the film when the film is separated from the film-holding member.

Figure 3:
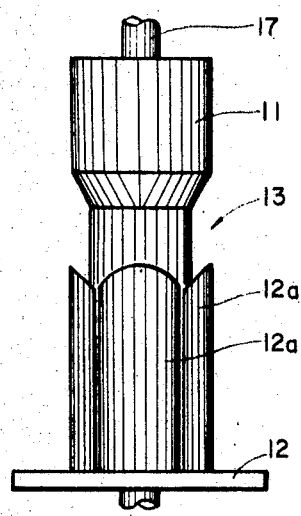
FIG. 3 is an elevation of a spool according to the present invention.
Figure 4:
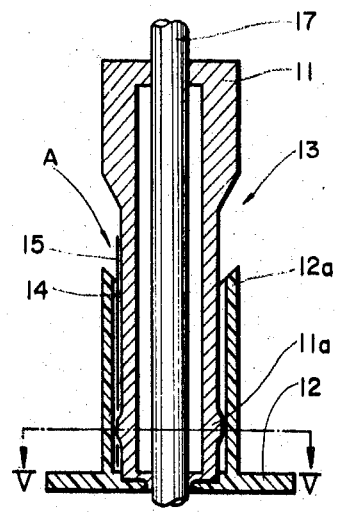
FIG. 4 is a vertical sectional view of the spool shown in FIG. 3.
Figure 5:
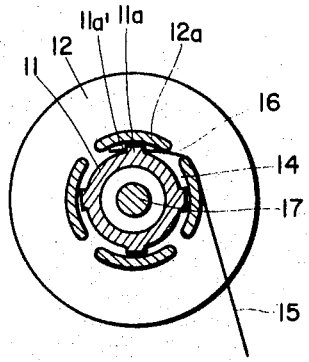
FIG. 5 is a sectional view taken along the line V—V of FIG. 4.
Figure 6:
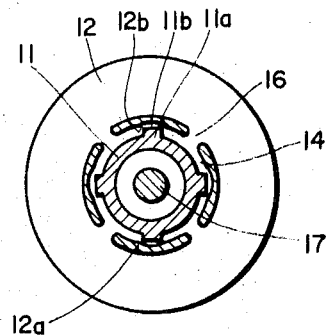
FIG. 6 is a view similar to FIG. 5, illustrating a different embodiment of the present invention.

FIGS. 3, 4, and 5 illustrate an embodiment of a spool according to the invention, which obviate the aforesaid difficulties of the conventional spools. In the figures, a spool 13 comprises a stepped cylinder or hub 11 which includes an upper hub section and a coaxial lower hub section of smaller diameter than the upper hub section and a film-holding means 12, which is disposed so as to face a small-diameter portion section of the stepped cylinder 11 with a suitable space therefrom. The space between the small-diameter portion of the stepped cylinder 11 and the film-holding means 12 is in the form of an annular space or slit 14 of cylindrical shape. One or more claws 11a which define film sprocket aperture engaging elements are integrally and radially formed on the peripheral surface of the small-diameter portion of the stepped cylinder 11 at such positions of the slit 14 where perforations of a film 15 are to assume when the film is inserted into the slit 14. Each of the claws 11a has sloped edges extending in the longitudinal direction of the stepped cylinder 11. The peripheral or tip end surface of each claw 11a is spaced from the inner surface of a cylindrical portion 12a of the film-holding means 12 by a distance large enough to permit the passage of the film 15 therethrough. The cylindrical portion 12a of the film-holding means 12 is divided into sections or tongues by slits 16 longitudinally extending parallel to the longitudinal axis of the stepped cylinder 11, the outer cylindrical faces of the tongues lying in the cylindrical peripheral plane of the hub upper section, as shown in the drawings. Moreover, the tongues have upwardly convex curved upper parts and top edges which are inwardly downwardly bevelled, as illustrated, and delineate passageways whose sides converge downwardly toward slits 16. The slits 16 are the same as the claws 11a in number. Leading end or tail portion of the film 15 which is, as conventional, of reduced width with its upper section cut away is inserted into the slit 14 through one of the slits 16 of the cylindrical portion 12a of the film-holding means 12. Referring to FIG. 6, it is also possible to use claws 11a which extend further toward film-holding means 12, by forming suitable recesses 12b on the inner surface of the cylindrical portion 12a of the film-holding means 12, so as to cooperate with such claws 11a.

A rotary shaft 17 engages the spool 13 by a suitable known frictional means (not shown), in such manner that the rotary shaft 17 drives the spool 13 as long as the friction between them is smaller than a certain value. When the friction between the shaft 17 and the spool 13 exceeds the certain value, the shaft 17 slips on a cooperating surface of the spool 13.

In operation, when the reduced width tail or leading end of the film 15 is inserted into the slit 14, through one of the slits 16, as shown by the arrow A of FIG. 4, a side edge of the film 15 passes over the claw 11a and comes to a loaded position and stops there. The position of the claws 11a is such that one of the claws 11a engages one of the sprocket-engaging perforations of the film, or comes into engagement with the perforation as the film 15 is pulled along the longitudinal direction of the film. In this case, the longitudinal direction of the film should substantially coincide with the tangential direction of the stepped cylinder 11. The perforated edge portion of the film slides over the tip of the claw 11a until one of the perforations engages the claw 11a. Thus, the film 15 is held by the film-holding means 12 of the spool 13.

Figure 7:
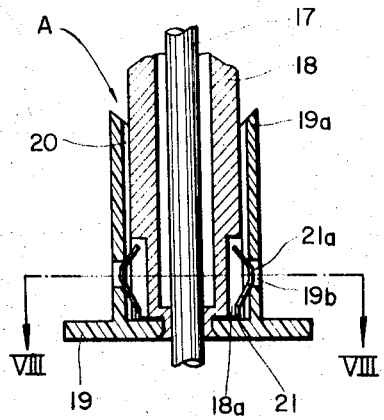
FIG. 7 is a vertical sectional view of a different film-holding means usable for the spool according to the present invention.
Figure 8:
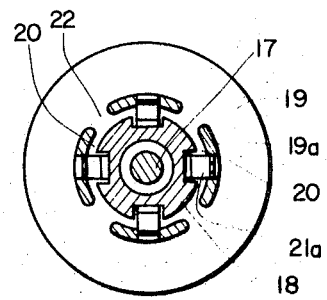
FIG. 8 is a sectional view taken along the line VIII—VIII of FIG. 7.

FIGS. 7 and 8 illustrate another embodiment of the present invention, in which claws engageable with perforations of a film are made of resilient members, instead of solid members of the preceding embodiment. In the figure, a film-holding means 19 has a cylindrical portion 19a which is connected to the small-diameter portion of a stepped cylinder 18 so as to form a cylindrical slit 20 between them, in the same manner as the preceding embodiment. One or more resilient claws 21, each having a projected portion 21a with sloped portions extending along the longitudinal direction of the cylinder 18, are integrally secured to the film-holding means 19 at such a position where perforations of a film assume when being inserted into the slit 20. In this embodiment, the small-diameter portion of the stepped cylinder 18 has radially disposed notches or recesses 18a so as to receive the resilient claws 21 therein, while allowing resilient or flexible bending of the claws 21. The cylindrical portion 19a of the film-holding means 19 is divided into sections by slits 22 in the same manner as the preceding embodiment, and holes or recesses 19b are formed in each of the divided sections of the cylindrical portion 19a so as to cooperate with the projected portions 21a of the claws 21. Each projected portion 21a fits in the hole or recess 19b to positively hold the film 15 by pinching one of the perforations of the film between the projected portion 21a and recess 19b.

In operation, when the leading end of a film 15 is inserted into the slit 20 through one of the slits 22, as shown by the arrow A of FIG. 7, an edge of the film 15 passes over the projected portion 21a of one of the claws 21 by resiliently depressing the claw, until the edge comes to a loading position. Thus, one of the perforations of the film 15 engages the projected portion 21a of the claw 21, or comes into such engagement when being pulled in the longitudinal direction of the film, in the same manner as the preceding embodiment.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What we claim is:

1. A film-winding spool comprising a longitudinal hub including a first cylindrical section and a coaxial second section of lesser diameter than said first section, a plurality of circumferentially spaced longitudinal tongues surrounding and radially spaced from said second section and having free ends longitudinally spaced from said first section, the confronting edges of successive tongues delineating a plurality of circumferentially spaced slits parallel to the hub axis and affording transverse access to the space between said tongues and said first section and the space between the free ends of said tongues and said hub affording longitudinal access to said space between said tongues and second section, the outer faces of said tongues substantially lying in the cylindrical plane of the peripheral face of said first section, and a plurality of circumferentially spaced film sprocket aperture engaging elements extending transversely in the space between said tongues and second section and having free ends and longitudinally spaced upper and lower faces converging toward said free ends.

2. The spool of claim 1 wherein said engaging elements extend outwardly from said hub second section toward said tongues and said upper and lower faces of said elements are outwardly downwardly and outwardly upwardly inclined respectively.

3. The spool of claim 2 wherein said elements are positioned on said hub second section and said tongues have recesses formed in the inner faces thereof confronting respective engaging elements.

4. The spool of claim 2 wherein each of said engaging tongues has a recess formed in its inner face and each of said engaging elements is resiliently mounted and separably urged into engagement with respective recesses.

5. The spool of claim 1 wherein the free end edges of each of said tongues converge toward the respective free ends to delineate converging passageways to said slits.

6. The spool of claim 1 wherein the free end edges of said tongues are bevelled to provide inwardly downwardly inclined top surfaces.

7. A spool for winding up films, comprising a cylindrical member provided with a small-diameter portion and a large-diameter portion, a film-holding member composed of plural tongues which encloses said small-diameter portion of the cylindrical member so as to leave settled slits therebetween, said slits extending respectively in parallel with the longitudinal axis of the cylindrical member, said tongues providing an interrupted outer cylindrical surface of which diameter is equal to that of said large-diameter portion of the cylindrical member, and projections extending respectively from the cylindrical member towards said tongues in each of said slits, each of said projections having upper and lower side faces inclined along the longitudinal direction of the cylindrical member and diverging gradually towards said cylindrical member, any of said projections being engageable with one of perforations of the film to be wound up so that the projection prevents relative movement between the spool and film in the longitudinal direction of the film.

8. A spool according to claim 7 wherein each of said projections being secured to the cylindrical member, and a recess is formed to the inner side of each of tongues so as to oppose to each one of the projections.

9. A spool according to claim 7 wherein each projection is formed on an elastic member which has one end secured to the cylindrical member, and a recess is formed to such portion of each one of the tongues that each one of the projections is opposed respectively, top of each of said projections entering into each of said recesses respectively.